Feb. 28, 1933.                E. FLETCHER                1,899,436
                              WEIGHING SCALE
                            Filed May 9, 1930            2 Sheets-Sheet 1

INVENTOR.
Edward Fletcher.
BY
Edwin P. Corbett
ATTORNEY

Feb. 28, 1933.　　　E. FLETCHER　　　1,899,436
WEIGHING SCALE
Filed May 9, 1930　　　2 Sheets-Sheet 2

INVENTOR.
Edward Fletcher.
BY
ATTORNEY

Patented Feb. 28, 1933

1,899,436

UNITED STATES PATENT OFFICE

EDWARD FLETCHER, OF COLUMBUS, OHIO, ASSIGNOR TO THE EXACT WEIGHT SCALE COMPANY, OF COLUMBUS, OHIO, A CORPORATION OF OHIO

WEIGHING SCALE

Application filed May 9, 1930. Serial No. 450,947.

My invention relates to weighing scales. It relates, more particularly, to that type of weighing apparatus wherein a check rod is utilized to maintain the weight-receiving pan and the commodity pan in proper position. More specifically, this invention has to do with a novel form of check rod and support therefor.

There are certain fundamental characteristics that must be maintained in a weighing scale if accurate weighing is to be obtained. Included among these characteristics, is the principle of a vertical longitudinal parallelogram, found in an even balanced type of scale, that is produced by the longitudinal center line of the beam, the longitudinal center line of the check rod and the vertical center line of each respective outrider stem.

This large parallelogram is split up into two smaller parallelograms by the vertical central line of the center yoke, that is, the vertical line from the central pivot of the beam to the central pivot of the check rod. It is customary to make this vertical line from the central pivot of the beam to the central pivot of the check rod a fixed line. On either side of this line, the beam, the check rod and the outrider stems tilt to varying positions.

The primary function of this check rod is to guard against errors which may arise from the placing of a weight or commodity in off-center position upon a platter. The check rod ensures that the deflection of one outrider stem from its normal vertical position will result in a corresponding deflection of the other outrider stem.

Heretofore, the check rod structure of an even balanced type of scale has embodied a lever provided with a central slot and two end openings placed equidistant therefrom. With this form of check rod, the lower ends of the outrider stems are pivotally connected to the outer ends of this check rod by means of pins inserted in these hereinbefore-mentioned end openings. The check rod is supported by means of a pin located in the central slot and extending between the bifurcated lower end of the center yoke.

The inventor has discovered that, in this old style check rod, the actual or effective distances of the parallelogram are not equal. That is to say, the off-center application of a load on one of the outrider elements will result in an application of force that will render the respective longitudinal sides of the parallelogram extending between the center pivot and either one of the outrider elements unequal. The technical aspects of this inequality arising from the off-center application of force will be referred to hereafter more in detail in connection with the detailed description of this invention.

It is enough to say that such an error produces a serious inaccuracy in the scale which mechanically results in the binding of the check rod and the outrider stems under heavy loads, and thereby obviates the accurate balance of the beam. In the past, it has been customary to adjust the relative length of the outrider stems to correct the unequal condition of the longitudinal sides of the parallelogram. Such change in the structure of the scale involves a great loss of time and labor and necessitates an added expense which increases the cost of production.

One object of this invention is to provide a weighing scale that will operate to weigh accurately under conditions where the load is applied on the weight or commodity pans in off-center position with relation to the vertical center line of the outrider stem.

Another object of this invention lies in the provision of a structure wherein the off-center influences applied to the weight or commodity pan will not destroy the proper functioning of the movable parts, either under normal or abnormal loads.

Still another object of my invention is to provide a weighing scale wherein such features as disalignment of parts, binding and friction arising from the off-center position of a load will be obviated.

A still further object of this invention is to provide a simple type of check rod that may be easily and cheaply manufactured and may be assembled in proper position in a weighing scale in a minimum of time and with a minimum of effort.

This present invention contemplates the provision of a check rod and a support therefor by means of which the inaccuracy in a weighing scale arising from the employment of the old style check rod is obviated. More specifically, it contemplates a check rod provided with openings in the ends thereof but which is provided with a fixed pin in the center thereof instead of the customary slot.

The center pin of this check rod is located in a transverse vertical slot formed by two pair of bearing members carried by a bearing block. The inner vertical ends of these bearing members are rounded which produces a minimum contact area with the pin in view of the fact that two cylindrical surfaces are contacting with each other. The operation of this check rod under the forces set up by an off-center application of force on the outrider stem will be hereinafter referred to in the detailed description wherein it will be shown how the provision of this type of check rod will serve to maintain the equality of the longitudinal sides of the (imaginary) parallelogram under off-center application of force.

Other objects and advantageous features of this invention will be noted in the following detailed description and one embodiment of this invention is shown in the accompanying drawings wherein like figures of reference designate corresponding parts and wherein.

Figure 1:
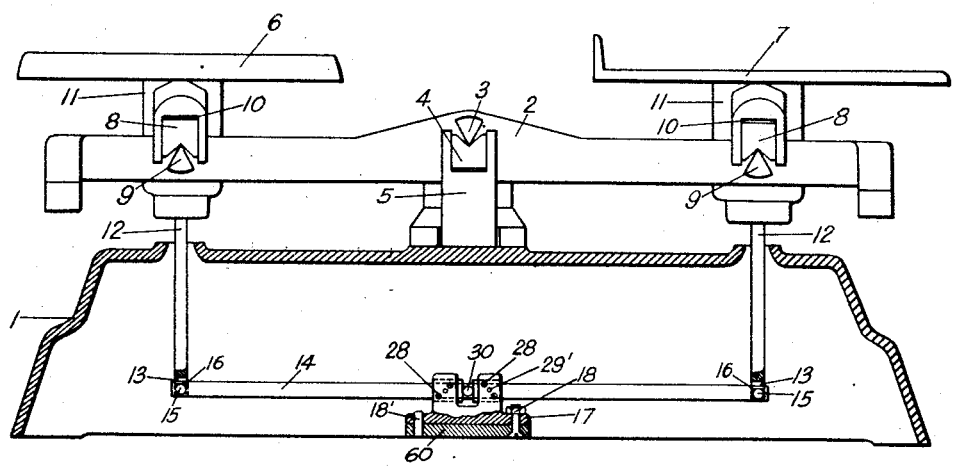
Figure 1 is a front view of a weighing scale, partly broken away, showing my preferred form of check rod mounted in position in a weighing scale of the even balanced beam type.

With reference to the drawings, I have shown a weighing scale of the even balanced beam type which comprises a base structure 1 upon which is pivotally mounted the even-balanced beam 2 that is supported by the oppositely disposed knife-edge trunnions 3 seated in the bearings 4. These bearings are located in the bifurcated upper end of the beam support member 5 which rests on the upper surface of the scale base.

The scale beam is also shown as being provided with the weight platters 6 and 7 respectively, that are pivotally associated with the beam 2 by means of the bearings 8 and the knife-edge trunnions 9. These bearings 8 are carried by the respective ends of the transverse section 10 of the outrider elements 11.

Each outrider element 11 is identical as to structure and is provided with a downwardly extending stem 12 having the lower end thereof bifurcated as at 13 to straddle the end of the check rod 14. The lower ends of these stems 12 are pivotally connected with the check rod 14 by means of pins 15 which extend through openings in the lower end of the stems 12. The outer ends of these pins 15 are located in the square openings 16 formed in opposing ends of the check rod and equidistant from the vertical center line thereof. Each of the pins 15 may be held against displacement from the openings by means of cotter-keys disposed in each end therof.

I have preferably made these openings square in view of the fact that the contact area between the pin 15 and the side walls of the square opening is materially reduced over a structure wherein a round pin and round opening is utilized. Furthermore, the application of force on any one of the four walls of this opening will be at a single point thus materially reducing the friction that would normally arise from the employment of a round opening and a complemental pin.

The pins 15, or rather the pivot points between the outrider stems 12 and the check rod 14 are each respectively in direct vertical alignment with the vertical center line of the knife-edge trunnions 9 located directly thereabove and supporting the outrider elements 11 and the weight and commodity pans 6 and 7, respectively. Furthermore, the pivot points 15 are in direct longitudinal alignment as are the knife-edge trunnions 9 mounted upon opposing ends of the scale beam.

In mounting the check rod 14, I have provided a centrally located bearing block 17 that is adapted to be securely bolted to cross support 60 by means of the oppositely located bolts 18 and permanently located on dowel pins 18'. This bearing block preferably comprises a body portion having an upwardly opening transverse slot 19 and an upwardly opening longitudinal slot 20 extending parallel with the check rod 14.

Figure 3:
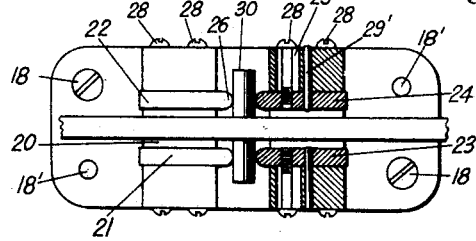
Figure 3 is a plan view partially in section of the central bearing support for my novel check rod.
Figure 4:
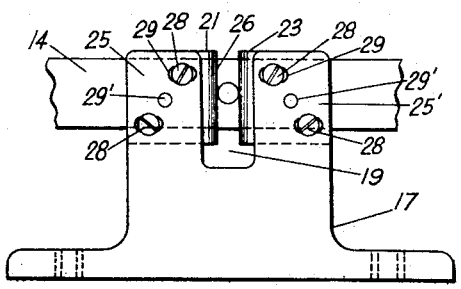
Figure 4 is a side elevation of the bearing support shown in Figure 3.

Two pairs of bearing members 21, 22 and 23, 24 are carried within the longitudinal passage 20 and project into the transverse slot 19, Figures 3 and 4. These bearing members are identical as to form and the preferred structure thereof is best shown in Figure 3. Each bearing member is shown as comprising a body portion having a substantially rounder hardened forward end as at 26, Figure 5.

Figure 5:
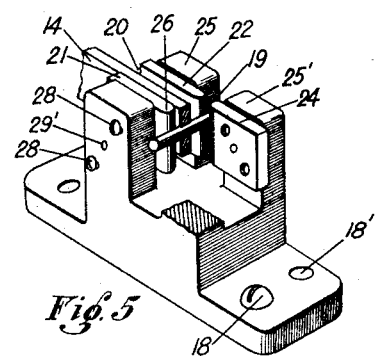
Figure 5 is a perspective view, partly broken away, of my bearing support.

As will be noted in Figures 3 and 5, the contact members 21 and 22 are mounted in parallelism on opposing faces on the transversely opposing bearing posts 25 and project into the transverse slot 19 from the left in opposition to the other two members 23 and 24 that are also mounted in parallelism and project into the slot 19 from the right, the bearings 23 and 24 being mounted on the opposite transversely opposing bearing posts 25'. The rounded forward end 26 of the bearing members lie in the transverse slot 19 for a reason that will be hereinafter apparent. Each bearing member is adjustable for initial setting by the screw bolts 28 and that extend through diagonally located slots 29, Figure 3, formed in each respective bearing post 25 and 25'. When these bearing members have been adjusted to proper position wherein the rounded forward ends 26 of each pair are properly positioned, each respective bearing may be fixed in such position against subsequent longitudinal movement by means of a dowel pin 29'.

With reference to Figures 3 and 5, it will be noted that the check rod 14 is adapted to lie in the longitudinal slot 20 and is equipped with a transverse pin 30 extending outwardly on either side of the check rod. This pin may be formed integrally with the check rod or may be mounted thereon in any manner desired as long as it is immovable with relation thereto. This rounded pin 30 is adapted to lie between and to contact with the rounded hardened inner ends of these two sets of bearing members 21 and 22 and 23 and 24 as best shown in Figure 3. It will be apparent that such a pin and bearing structure will produce a minimum contact area, inasmuch as there are two cylindrical surfaces contacting with each other.

The center line of the pin 30 is at the longitudinal center of the check rod 14 and is in direct alignment with the center line of the knife-edge bearings 3 supporting the scale beam.

Figure 6:
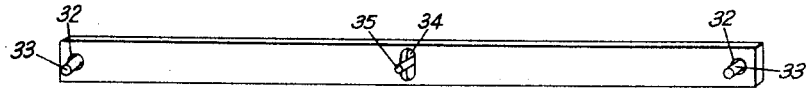
Figure 6 is a perspective view of the old form of check rod commonly used in scales of this type.

One phase of my invention has to do with the fact that my novel form of check rod corrects an error present in certain types of check rods commonly used in the art. This correction is important and in order to properly explain how the error occurs, I have thought it advisable to present comparative drawings illustrating the difference in action between a scale using my type of check rod and a scale using the prior art type of check rod mentioned. This prior art type of check rod is illustrated in Figure 6 and the diagrammatic comparison of the distribution of forces in Figures 7 to 10, inclusive.

Before discussing these diagrams, it might be said that the existence of error in scales using the old type check rod has long been known. It has been the practice in the art to attempt to compensate for this error by adjusting the length of the outrider stems. This, however, is a laborious and costly operation and, even after the best possible adjustment is obtained, the error still remains and positively limits the load capacity of the scale, resulting in eventual locking of the parts, whenever a certain amount of weight is placed upon a platter in off-center position.

Figure 7:
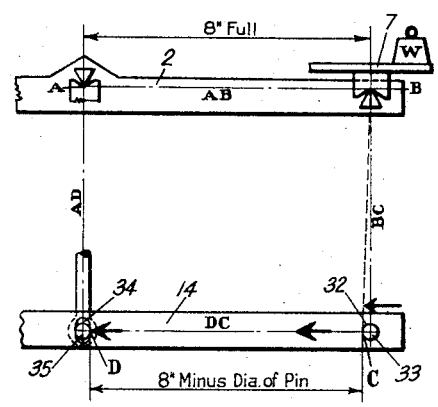
Figure 7 is a diagrammatic view of one side of a scale using the old form of check rod wth a parallelogram of the forces superimposed thereon and illustrating the defects which occur when a weight is placed on the outer side of the center of the platter.
Figure 8:
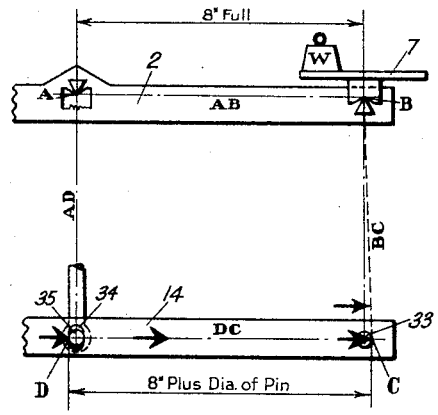
Figure 8 is a view similar to Figure 7 but illustrating the error which occurs when the weight is placed upon the inner side of the platter.

The reason for the error in a scale using this old type of check rod is clearly shown by the parallelograms of forces shown in Figures 7 and 8, only one side of the scale being shown in view of the fact that the conditions on both sides are identical. Thus, in Figure 7 it will be noted that a weight has been placed off-center upon the plate 7, being upon the outer side of this platter. This tends to cause the platter to pivot about the point B and to throw the outrider inwardly towards the center of the check rod. The result is that the pin 33 is forced against the side wall of the opening 32 and exerts pressure thereagainst at the point C. This pressure is transmitted through the check rod to the pin 35 carried by the center yoke, pressure being exerted upon this pin by the near wall of the slot 34 at the point D. It is fundamental in scales of this type that the opposing sides of the parallelogram must be of equal length, if acurate weighing is to be obtained. However, from this showing in Figure 7, it will be seen that the side A B of the parallelogram, being the line between the center knife-edge and the outrider knife-edge, is longer than the side D C which is represented by a line between the points of contact D and C. In actual figures, if the side A B of the parallelogram in this structure is a full eight inches in length, the side D C will be eight inches minus the diameter of the pin 35.

In Figure 8, a similar condition is illustrated, except that the weight is placed on the inner side of the platter. Under these conditions, the side A B of the parallelogram is shorter than the side D C of the parallelogram. This is occasioned by the fact that the placing of the weight upon the inner side of the platter tends to throw the outrider stem outwardly so that the pin 33 exerts a force against the outer side of the opening 32, contact being made at the point C. This pulls upon the check rod and pulls the further wall of the slot 34 against the pin 35 carried by the center yoke, contact being made at the point D. The result is that, if the side A B of the parallelogram is eight inches in length, the side D C of the parallelogram will be eight inches plus the diameter of the pin 35. This introduces a plus error which is equally as harmful as a minus error.

Figure 2:
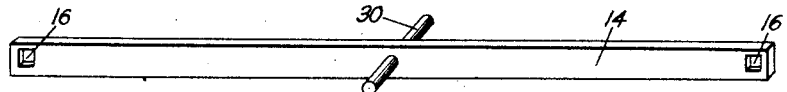
Figure 2 is a perspective view of my preferred form of check rod detached from the scale.
Figure 9:
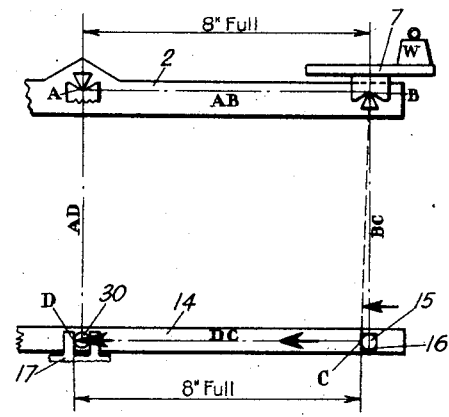
Figure 9 is a view smilar to Figure 7 of a structure embodying my novel type of check rod and illustrating the absence of error when the weight is placed on the outer side of the platter with my structure in comparison with the presence of error under the same condition demonstrated in Figure 7.
Figure 10:
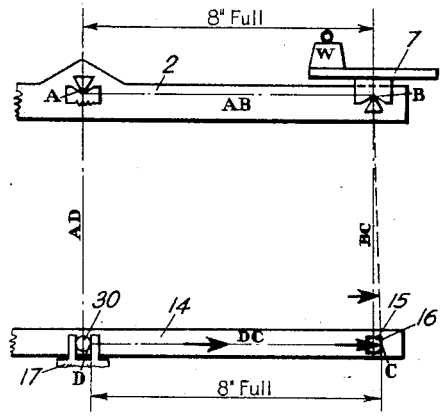
Figure 10 is a view similar to Figure 8, with the exception that my novel form of check rod is used, this figure illustrating the absence of error with my structure when the weight is placed on the inner side of the platter in comparison with the presence of error which occurs with the old form of check rod as shown in Figure 8.

In Figures 9 and 10, however, it will appear that I have used a check rod of the type shown in Figure 2, wherein the center pin is carried by the check rod instead of by the center yoke. The parallelogram of forces illustrated in these figures demonstrate that the opposing sides of the parallelograms are equal and that all error is obviated.

Thus, in Figure 9, the weights placed upon the outer side of the plater and this tends to throw the lower end of the outrider stem inwardly towards the center of the check rod. The pin 15 carried by the lower end of the outrider stem contacts with the inner wall of the opening 16 at the point C. Force is transmitted through the check rod and through the transverse pin 30 thereof to the furthermost wall of the bearing, making contact at the point D. The result is that the side A B of the parallelogram is of the same length as the side D C of this parallelogram. Thus, if the side A B of this parallelogram is a full eight inches, the side D C thereof will also be a full eight inches. This demonstrates that error is obviated.

Figure 10 shows the same structure as Figure 9, merely illustrating the distribution of forces when the weight is placed upon the inner side of the platter 7. This tends to throw the lower end of the outrider stem outwardly so that its pin 15 makes pressure contact with the wall of the opening 16 at the point C. This tends to pull the check rod and causes the center pin 30 thereof to contact with the center bearing at the point D. Thus, the side A B of the parallelogram is of equal length with the side D C thereof.

Stated another way, it will be seen that in a scale using the old style of check rod, the lower side of the parallelogram will be either short the diameter of the pin 35 or will be long the diameter of the pin 35, whereas, with my type of check rod, either the pin 30 or the pin 15 will have its diameter included within the length of the side D C of the parallelogram.

Another important aspect of my invention arises from the novel structure of center bearing for the check rod. In the first place this bearing structure, as shown best in Figures 3, 4 and 5 is extremely rigid. Furthermore, it permits adjustment of the contact portions of the bearing to any desired position after the scale is assembled. In addition, the center pin of the check rod is freely movable up and down in its bearings which permits the ready removal of the check rod without dissembling the scale other than to disconnect the check rod from the outriders.

One of the drawbacks in the old type of check rod arises from the difficulty of hardening the metal constituting the walls of the check rod. In order to do this effectively in the past, it has been necessary to harden the entire check rod or harden a disk containing the slot and then introduce it into the check rod. Where the whole check rod is hardened, a certain amount of distortion usually occurs and considerable labor is required to correct this distortion. In the hardening of a disk and then introducing it into the check rod, a substantial amount of labor is necessarily involved and this is complicated by the difficulty in positioning the disk in the check rod in such a way that the slot may be absolutely vertical.

With the new method, the slot is produced by a plurality of bearing members which are no part of the check rod and which may be adjusted without difficulty to any desired position and then permanently fixed in such position. In this new method, there is no such difficulty as set out in the above paragraph because the pin which is carried in the center of the check rod is hardened before it is introduced in the check rod and, in fact, is merely a piece of round tool steel hardened and of proper dimension which has been pressed into a hole in the check rod. Furthermore, since my structure provides a plurality of bearing members on each side of the central pin a much more rugged structure results.

One of the important results of the novel type of check rod and bearing therefore is that, since the error of the parallelogram is corrected, it is possible to use a larger size pin at the center of the check rod and likewise at the ends of the check rod. With the check rod of the old type, the error in the length of one side of the parallelogram was determined by the diameter of one of these pins and, therefore, the larger the pin used, the larger the error. This constituted a serious weakness in prior scales and one particularly important in heavy duty scales. With the present type of bearing and check rod, however, the error has been removed and a pin may be selected of adequate size without in any way detracting from the accuracy of the scale.

Another important advantage of my invention results in the fact that the check rod bearings and the round bearing pin are of such form that the surfaces thereof in actual contact may be made extremely hard. Furthermore, since it is not necessary to resort to knife edges as in the French check rod system, in order to reduce the amount of friction, it is possible to produce a much more rugged structure. These characteristics present obvious advantages over such devices as the French check rod. For example, the round parts of the present device may be made considerably harder than the knife edges of the French check rod system, with a consequent reduction of friction. There are other obvious advantages.

Having thus described my invention what I claim is:

1. A weighing scale comprising a body portion, a beam, outrider members, a check rod connected to said outrider member, and a bearing for said check rod, the connections between said check rod and said outrider members and said bearing and check rod being pin and hole connections of such form that a force applied to one side of either end pin will be transmitted to the same side of the bearing pin so that the substantially horizontal sides of the vertical parallelograms will always be equal.

2. A weighing scale comprising a body portion, a beam, outrider elements, a pivoted check rod pivotally connected to said outrider elements, pins for effecting the pivotal mounting and the pivotal connection of said check rod with said outrider elements such pivotal mounting and pivotal connections being floating, one of said pins being carried by said check rod.

3. A weighing scale comprising a body portion, a beam, outrider elements carried by said beam, a check rod having a floating connection to said outrider elements, and a pin mounted on said check rod.

4. A weighing scale comprising a body portion, a beam, outrider elements, a check rod connected to said outrider elements, and a central pivot pin carried by said check rod.

5. A weighing scale comprising a body portion, a beam, outrider elements carried by said beam, a check rod having a pivot pin at its center, and a bearing having a slot for said pivot pin, said slot being open at one end.

6. A weighing scale comprising a body portion, a beam, outrider elements, a check rod, a central pivot pin on said check rod, a bearing having a slot for said pivot pin, such slot having adjustable walls.

7. A weighing scale comprising a body portion, a beam, outrider elements, a check rod, a central pivot pin on said check rod, and adjustable members for said central pivot pin.

8. A weighing scale comprising a body portion, a beam, outrider elements carried on said beam, a check rod, a central pivot pin, and spaced pairs of bearing members cooperating with said pivot pin.

9. A weighing scale comprising a body portion, a beam, outrider elements on said beam, a check rod, a pivot pin, and bearing members for said pivot pin having rounded contact surfaces.

10. A weighing scale comprising a body portion, a beam, outrider elements on said beam, a check rod, a pivot pin, and bearing members for said pivot pin having hardened rounded contact surfaces.

11. A bearing for the check rod of a weighing scale comprising a body portion, and spaced contact members adjustable towards and away from each other.

12. A bearing for the check rod of a weighing scale comprising a body portion, spaced pairs of contact members, and a pin mounted to contact with the edges of said spaced pairs of contact members.

13. A bearing for the check rod of a weighing scale comprising a body portion, and spaced pairs of contact members adjustable towards and away from each other.

14. A check rod bearing for a weighing scale comprising a body portion, spaced contact members with rounded contact surfaces, and a cross pin for co-operation therewith.

15. A weighing scale comprising a check rod, a pin carried on said check rod and projecting from both sides thereof, and a bearing having bearing members contacting with said pin on both sides of said check rod.

16. A weighing scale comprising a pivotally mounted beam, outrider elements pivotally mounted on said beam, a check rod located in parallelism with said beam and disposed therebelow, pivotal connection between the ends of said check rod and the stems of said outrider elements, and a pin centrally located on said check rod and supported between a plurality of bearing members.

17. In a weighing scale, a check rod having openings in the ends thereof equidistant from the vertical center line thereof, a pin mounted on said check rod, and a support for said pin comprising a member having a transverse and a longitudinal slot therein having bearing members located in said longitudinal slot and projecting into said transverse slot.

In testimony whereof I hereby affix my signature.

EDWARD FLETCHER.